Patented May 27, 1941

2,243,802

UNITED STATES PATENT OFFICE 2,243,802

METHOD FOR TREATING FOOTS OF SPIRITS OF TURPENTINE TO OBTAIN PHENOL ETHERS

Torsten Hasselström and Burt L. Hampton, Savannah, Ga.; said Hampton assignor to G & A Laboratories, Inc., Savannah, Ga.

No Drawing. Application November 28, 1938, Serial No. 242,862

5 Claims. (Cl. 260—612)

The present invention relates to refining of foots of gum spirits of turpentine and/or processed gum spirits of turpentine.

The object of this invention is to obtain valuable products from the higher boiling fractions of spirits of turpentine obtained by fractionating foots of spirits of turpentine boiling above about 163 degrees C. and/or foots of processed gum spirits of turpentine, etc., boiling at or above the highest boiling fractions of terpene alcohols. More specifically, our invention relates to the practical preparation of phenol ethers, such as, for instance, anethol and/or methyl chavicol from gum spirits of turpentine, which products are indicated by the literature as not being present in gum spirits of turpentine.

It is already known that, when spirits of turpentine is subjected to fractional distillation, about 90–95 percent of terpenes boiling below about 163 degrees C. are obtained, consisting essentially of alpha- and beta-pinene. The remaining foots represent a complex high boiling and viscous product. These foots are not recognized as a commercially valuable product, and in effect constitute an industrial waste, as values recovered therefrom do not pay for the cost of recovery.

In accordance with the present invention, these foots may be subjected to fractional distillation, preferably in vacuo, whereby a series of higher boiling compounds of the terpene type are obtained. In the process of such fractionation, it has been found that the fractions boiling at about 60–90 degrees C. under 10 to 12 mm. pressure and 106–115 degrees C. under 14 mm. pressure and having a specific gravity of about 0.86–0.98 and having a refractive index of about $n_D=1.47$ to 1.55, contain substantially phenol ethers of the methyl chavicol and/or anethol type: these fractions on oxidation with potassium permanganate in aqueous solution yield anisic acid.

We may use, in our process, fractional distillation of the foots of gum spirits of turpentine and/or foots of processed gum turpentine such as, for instance, hydrated gum spirits of turpentine. These may be subjected to distillation with steam or superheated steam in vacuo or at ordinary pressure, whereby lighter boiling terpenes are separated and removed from high boiling pitch-like substances. The lighter boiling terpenes separated by distillation by steam or superheated steam are, according to our invention, after drying, subjected to fractional distillation at ordinary or reduced pressure. The fractions boiling at about 60–94 degrees C. under 10 to 12 mm. pressure and 106–115 degrees C. under 14 mm. pressure have a refractive index of about $n_D=1.47$ to 1.55 and specific gravity of about 0.86 to 0.98, and contain substantially phenol ethers of the methyl chavicol and/or the anethol type.

Further, it has been found that the yield of phenol ethers is substantially of the anethol type when the fractions are boiled with an alkali prior to the fractionation for separating the phenol ethers. This alkali is preferably sodium hydroxide, but other alkalis such as potassium hydroxide, calcium oxide, etc., may be employed.

Instead of foots of gum spirits of turpentine, the fractions boiling at or above borneol, fenchol alcohol, terpeneols, i. e., pine oil, such as obtained by hydration, etc., of gum spirits, for instance, may be subjected to vacuum distillation and/or distillation with steam or superheated steam and the volatile constituents fractionated whereby fractions are obtained which boil at about 60–94 degrees C. under 10 to 12 mm. pressure and 106–115 degrees C. under 14 mm. pressure and have the physical characteristics of a specific gravity of about 0.86 to 0.98 and a refractive index of about $n_D=1.47$ to 1.55, and which on oxidation with potassium permanganate yield anisic acid.

The invention is illustrated by the following examples, but is not restricted to the details described therein.

Example I 745 g. of foots of gum spirits boiling above 163° C. were subjected to fractional distillation under vacuum. The following fractions were obtained:

| | B. P. | Yield in grams | Percentage yield | Specific gravity at 25° C. | Refractive index at 25° C. |
|---|---|---|---|---|---|
| | *Pressure 10–11 mm.* | | | | |
| 1 | 50–55 | 68 | 9.02 | 0.8584 | $n_D=1.47352$ |
| 2 | 55–60 | 27 | 3.58 | 0.8614 | $n_D=1.47665$ |
| 3 | 60–70 | 13 | 1.72 | 0.8623 | $n_D=1.48076$ |
| 4 | 70–85 | 17 | 2.25 | 0.9057 | $n_D=1.49260$ |
| 5 | 85–94 | 68 | 9.02 | 0.9486 | $n_D=1.49279$ |
| | *Pressure 3 mm. with column* | | | | |
| 6 | 72–80 | 9 | 1.19 | 0.9444 | $n_D=1.49184$ |
| | *Pressure 3 mm. and without column* | | | | |
| 7 | 125–136 | 12 | 1.59 | 0.9537 | $n_D=1.50732$ |
| 8 | 136–150 | 8 | 1.06 | 0.9463 | $n_D=1.50843$ |
| 9 | 150–160 | 47 | 6.23 | 0.9369 | $n_D=1.51155$ |
| 10 | 160–170 | 51 | 6.67 | 0.9479 | $n_D=1.51599$ |
| | Total | 320 | 42.44 | | |
| | Residue | 424 | 56.24 | | |

The fractions 3, 4 and 5 contain substantially phenol ethers of the methyl chavicol and/or the anethol types. 10 g. of these fractions were oxidized with 705 cc. of a 4 percent potassium permanganate solution and stirred until the original red color of the potassium permanganate had disappeared. The manganese dioxide was filtered off. The remaining filtrate was evaporated to a small volume and acidified with dilute sulfuric acid. The precipitate was filtered off and recrystallized from water. Yield about 25 percent by weight (2.5 grams) of anisic acid melting about 175–180° C.

*Example II*

75 g. of the mixed fractions 3, 4 and 5 (atmospheric boiling point 205 to 231° C.) obtained in Example I were refluxed for three hours with 0.8 cc. of 50 percent sodium hydroxide solution. The sodium hydroxide solution was slowly added at 200° C. and the water permitted to immediately distill off. The product was then distilled under reduced pressure with fractions as follows:

| Fraction | B. P. | Pressure | Yield in grams | Specific gravity at 25° C. | Refractive index at 25° C. |
|---|---|---|---|---|---|
|   |   | Mm. |   |   |   |
| 1 | 84–88 | 10 | 3 | 0.9173 | 1.47949 |
| 2 | 88–90 | 10 | 3 | 0.9258 | 1.48290 |
| 3 | 90–92 | 10 | 8 | 0.9308 | 1.48705 |
| 4 | 92–93 | 10 | 8 | 0.9367 | 1.49469 |
| 5 | 104–106 | 14 | 9 | 0.9419 | 1.50251 |
| 6 | 106–110 | 14 | 8 | 0.9546 | 1.52046 |
| 7 | 111–113.5 | 14 | 8 | 0.9620 | 1.53177 |
| 8 | 78–80 | 1.5 | 6.8 | 0.9770 | 1.55206 |
| Residue |   |   | 7* |   |   |

*Of polymer.

The fractions 6, 7 and 8 contain substantial amounts of anethol.

Instead of fractionated foots of gum spirits of turpentine, crude foots of gum spirits of turpentine boiling above 163° C. may be employed, but the yield is not so satisfactory.

*Example III*

1 kg. of foots of gum spirits of turpentine boiling above 163° C. was steam distilled at ordinary pressure whereby was obtained 232 g. of steam-volatile terpenes. These were separated from the water. 232 g. of this product were distilled in vacuum at about 10–15 mm. reduced pressure. The following fractions were obtained.

| Fraction | Yield | Percentage | Specific gravity at 25° C. | Refractive index at 25° C. |
|---|---|---|---|---|
|   | Grams |   |   |   |
| 1 55–65 | 131 | 56.47 | 0.8501 | $n_D$=1.47371 |
| 2 60–85 | 20 | 8.62 | 0.8776 | $n_D$=1.48897 |
| 3 86–93 | 49 | 21.12 | 0.9416 | $n_D$=1.49316 |
| Residue | 8 | 3.45 | 0.9613 | $n_D$=1.49942 |
|   | 208 | 89.66 |   |   |

The third fraction contained substantially phenol ethers of the methyl chavicol and/or the anethol type since they yielded anisic acid when oxidized with potassium permanganate solution according to Example I.

When the steam-volatile terpenes were mixed with 2.5 cc. of the 50 percent sodium hydroxide solution and boiled with refluxing, and thereafter fractionally distilled under reduced pressure, yields corresponding to those of Example II above were obtained, including substantial amounts of anethol.

The anethol or the mixtures of methyl chavicol and anethol obtained by the foregoing procedures furnish a substitute for anise oil, and may also be employed in giving pleasant odors to various substances. Its addition to turpentine, for example, is advantageous. Further, fractions 1 to 5 in Example II may be advantageously mixed with turpentine for sale. Anethol itself may be employed in the treatment of colds and inflammation of mucous membranes.

The residue from the primary distillation of the foots may be employed as a cheap substitute for pine tar in plasticizing rubber, etc.

It will be understood that the invention is not limited solely to the examples set out, but that it may be practiced in other ways within the scope of the appended claims.

We claim:

1. The method of obtaining anethol, which comprises distilling foots of gum turpentine, separating the lighter boiling constituents, redistilling the said constituents fractionally in the presence of alkali, and recovering a fraction having a boiling point of 106 to 115 degrees C. at 14 mm. pressure and a refractive index of substantially $n_D$ 1.52 to 1.55 and containing anethol.

2. The method of obtaining anethol, which comprises fractionally distilling high boiling constituents of gum turpentine in the presence of alkali, and recovering a fraction having a boiling point of 106 to 115 degrees C. at 14 mm. pressure and a refractive index of substantially $n_D$ 1.52 to 1.55 and containing anethol.

3. The process of obtaining a phenol ether, which comprises fractionally distilling under vacuum and in the presence of alkali foots of gum spirits of turpentine boiling above 163 degrees C. and recovering a fraction having a boiling point of 70 to 94 degrees C. under 10 to 12 mm. pressure with a specific gravity of 0.86 to 0.94 and a refractive index $n_D$ 1.480 to 1.493.

4. The process of obtaining a valuable product from foots of gum turpentine, which comprises the steps of fractionally distilling the foots in the presence of alkali, and recovering a fraction boiling at 106 to 115 degrees C. under a pressure of 14 mm. and having a specific gravity of substantially 0.95 to 0.97 and a refractive index of substantially 1.52 to 1.55.

5. The process of obtaining anethol, which comprises fractionally distilling constituents of gum spirits of turpentine which boil above 163 degrees C., separating a fraction having a boiling point of 70 to 94 degrees C. under a pressure of 10 to 11 mm., boiling the fraction with alkali, and fractionally distilling and thereby obtaining a fraction boiling at 106 to 115 degrees C. under a pressure of 14 mm. and having a specific gravity of substantially 0.95 to 0.97 and a refractive index of substantially 1.52 to 1.55 and containing anethol.

TORSTEN HASSELSTRÖM.
BURT L. HAMPTON.